March 20, 1962  M. L. QUILLING  3,025,852
APPARATUS TO PREVENT FISHING HOLES FROM FREEZING
Filed Feb. 19, 1959
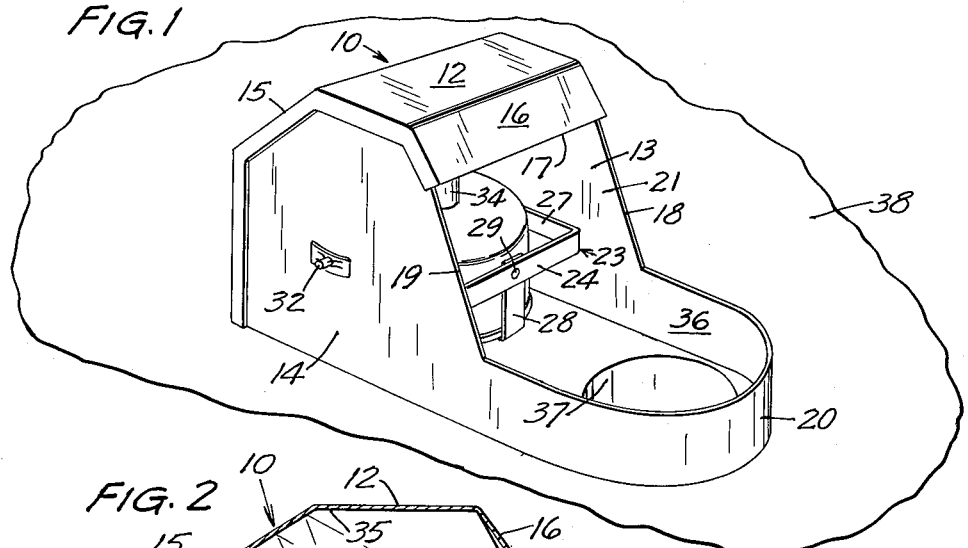
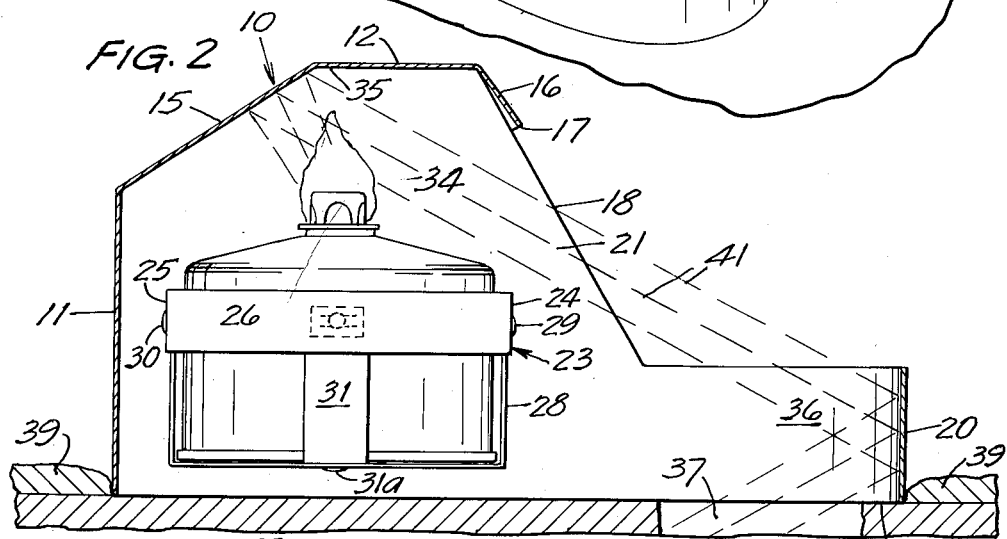
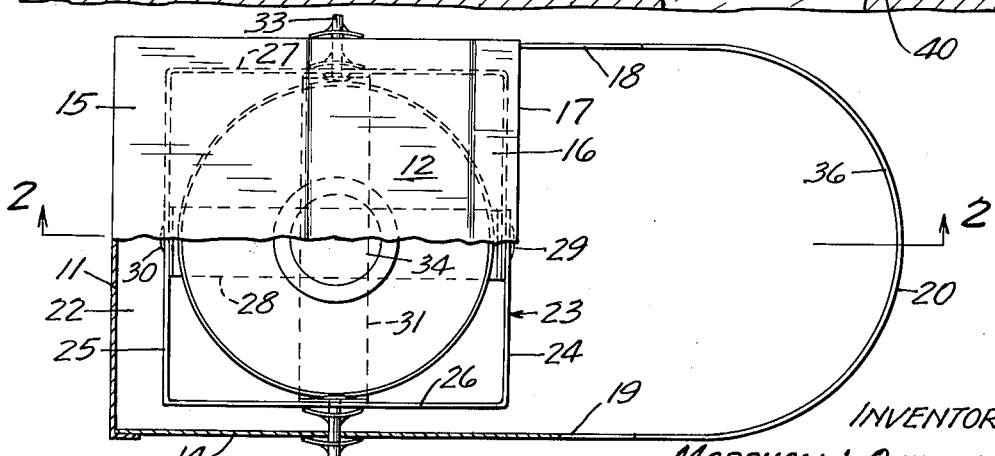
INVENTOR
MARSHALL L. QUILLING
BY Williamson, Schroeder & Palmatier
ATTORNEYS

United States Patent Office 3,025,852
Patented Mar. 20, 1962

3,025,852
APPARATUS TO PREVENT FISHING HOLES FROM FREEZING
Marshall L. Quilling, Rte. 1, Elk Mound, Wis.
Filed Feb. 19, 1959, Ser. No. 794,317
5 Claims. (Cl. 126—271.2)

This invention relates to a portable apparatus to prevent fishing holes from freezing and more specifically to a portable apparatus which prevents formation of ice over the entire area of a fishing hole.

In ice fishing it is necessary, at extremely cold temperatures, to maintain the fishing hole free of ice. Some of the conventional portable devices used to prevent the formation of ice in fishing holes fail to keep the peripheral portions of the hole free of ice thereby requiring additional effort to rid the hole of ice or such devices have overhanging parts which prevent free access to the fishing hole from above. My invention is directed to eliminate these disadvantages.

The general object of this invention is to provide a new and improved portable apparatus to prevent fishing holes from freezing whereby the entire surface area of an opening formed in an ice surface is maintained free of ice.

Another object of this inveintion is to provide a novel and improved apparatus to prevent fishing holes from freezing which has a plurality of heat reflecting areas for directing heat to the entire surface area of an opening in the ice surface to thereby prevent icing over of said opening.

A further object of this invention is to provide a novel and improved portable apparatus to prevent fishing holes from freezing which has a source of heat and which may be easily carried from one fishing hole to another without extinguishing the source of heat.

A still further object of the invention is to provide a novel and improved portable apparatus to prevent fishing holes from freezing constructed simply and inexpensively.

A still further object of the invention is to provide a novel and improved portable apparatus to prevent fishing holes from freezing constructed and arranged whereby the entire surface area of the hole is maintained free of ice and in which the fishing hole is freely accessible from above.

These and other objects and advantages of my invention will more fully appear from the following description made in connection with the accompanying drawings, wherein like reference characters refer to the same or similar parts throughout the several views, and in which:

FIG. 1 is a view in perspective of the invention;

FIG. 2 is a cross sectional view taken on line 2—2 of FIG. 3;

FIG. 3 is a top plan view of the invention with parts broken away.

In the embodiment shown, 10 designates a hood. Hood 10 comprises a rear wall 11, top wall 12 and side walls 13 and 14 respectively. Top wall 12 has a rearwardly inclined portion 15 and a forwardly inclined portion 16. Forwardly inclined portion 16 has a free front edge 17. Side walls 13 and 14 have downwardly sloping free front edges 18 and 19 respectively. Secured to the lower front portions of side walls 13 and 14 and projecting forwardly therefrom is an arcuate band element 20. Free front edges 18 and 19 of side walls 13 and 14 and the free front edge 17 of forwardly inclined portion 16 together with arcuate band element 20 form a portal 21. Referring now to FIG. 1 it will be seen that hood 10 has an open front and that band 20 has a width thereof oriented in upright relation when disposed in a position of use on an ice surface.

Disposed within hood 10 is a cradle-type carriage 22. Cradle-type carriage 22 comprises a rectangular band 23 which includes a front member 24, rear member 25 and side members 26 and 27 respectively. U-shaped element 28 is secured in fixed relation as at 29 and 30 to front part 24 and rear part 25 respectively. U-shaped element 31 is secured to U-shaped element 28 as at 31a. Side members 26 and 27 of rectangular band element 23 are pivotally attached to side walls 14 and 13 as at 32 and 33 thereby providing a pivotally supporting receptacle type carriage for a fuel burning source of radiant heat 34. Heat source 34 may be of the conventional oil type burner.

The inner surface of hood 10 comprises a first heat reflecting area designated by reference character 35. The inner surface of arcuate band 20 forms a second heat reflecting area 36. Reflected heat from burner 34 has been designated by lines 41.

When in use the device is placed around a hole 37 in an ice surface 38 so the arcuate band element 20 partially surrounds the hole whereby radiant heat generated from burner 34 reflected from the first heat reflecting area 35 is directed towards and into hole 37 and heat is also reflected from the second heat reflecting area 36 to hole 37. Thus it will be seen that some portions of the radiant heat are directed from the first heat reflecting area 35 to hole 37 while other portions of the radiant heat generated by burner element 34 are also directed into hole 37 by the second heat reflecting area 36. Some portions of the radiant heat directed outwardly of the open front of hood 10 will be directed against the second heat reflecting area 36 and thereafter will be directed into hole 37.

It will be noted that snow 39 will ordinarily be found adjacent the peripheral edges of the apparatus, while the ice within the confines of the arcuate band 20 has a glazed or melted surface 40 indicating the effect of the first heat reflecting area 35 and the second heat reflecting area 36.

In the event it is desirable to move from one fishing hole to another, the arcuate band 20 functions as a handle and provides a means for transporting the apparatus. In the drawings the apparatus is shown disposed around hole 37 in an ice surface 38 with the receptacle type carriage 22 disposed in upright relationship in an operative position. When band element 20 is grasped and the apparatus is lifted, carriage 22 freely moves by gravity about pivots 32 and 33 to a transporting position (not shown) and is maintained in upright relationship whereby the apparatus may be carried from one fishing hole to another without extinguishing the burner 34.

In the transport position, rear wall 11 then constitutes the bottom of the apparatus while the handle or arcuate band 20 constitutes the top of the apparatus.

It will, of course, be understood that various changes may be made in the form, details, arrangement and proportions of the parts without departing from the scope of my invention which consists of the matter shown and described herein and set forth in the appended claims.

What is claimed is:

1. An apparatus to prevent a fishing hole in an ice surface from freezing during use comprising a hood having a rear wall, a top wall and spaced side walls and an open front, a band element having the width thereof oriented in upright position, said band element projecting forwardly of said side walls and secured to said side walls at the lower portions thereof and forming a closed loop, said band element adapted to partially surround the hole, a fuel burning source of radiant heat disposed within said hood, the inner surface of said rear, top and side walls defining a first heat reflecting area for directing some portions of the radiant heat from said heat source to a region centrally of said band, the inner surface of said band element defining a second heat reflecting area for directing other portions of said radiant heat from said heat source and from said first heat reflecting area to a region centrally of said band.

2. An apparatus to prevent a fishing hole in an ice surface from freezing comprising a hood having a rear wall, a top wall and spaced side walls and an open front, a band element having width thereof oriented in an upright position, said band element projecting forwardly of said side walls and secured to said side walls at the lower portions thereof and forming a closed loop, said band element adapted to partially surround the hole, a burner element defining a source of radiant heat disposed within said hood, the inner surface of said rear, top and side walls defining a first heat reflecting area for directing some portions of the radiant heat from said burner element to a region centrally of said band, the inner surface in said band element defining a second heat reflecting area for directing other portions of said radiant heat from said burner element and from said first heat reflecting area to a region centrally of said band, said band element further functioning as a handle for carrying said apparatus, and means pivotally mounting said burner element to the side walls of said hood for swinging movement about a horizontal axis from an operating position to a transport position whereby said burner is maintained in upright relationship whether in the operating position or in transporting position.

3. An apparatus for directing radiant heat from a burner element into a fishing hole in an ice surface comprising a hood having a rear wall, a top wall and spaced side walls and an open front, an arcuate band element having the width thereof oriented in upright position, said band element projecting forwardly of said side walls and secured to said side walls a tthe lower portions thereof and forming a closed loop, said band element adapted to partially surround the hole, said hood adapted to confine a radiant heat generating burner element therein, the inner surface of said rear, top and side walls defining a first heat reflecting area for directing some portions of the radiant heat from said burner element to a region centrally of said band, the inner surface of said band element defining a second heat reflecting area for directing other portions of the radiant heat from the burner element and from said first heat reflecting area to a region centrally of said band.

4. An apparatus to prevent a fishing hole in an ice surface from freezing during use comprising a hood having a rear wall, a top wall and spaced side walls and an open front, said top wall having a forwardly inclined portion, an arcuate band element having the width thereof oriented in upright position, said band element projecting forwardly of said side walls and secured to said side walls at the lower portions thereof and forming a closed loop, said band element adapted to partially surround the hole, said side walls and said inclined top wall portion having free front edges, said free front edges of said side walls and said inclined top wall portion together with said band element forming a portal whereby said hole in said ice surface is freely accessible from above, a fuel burning source of radiant heat disposed within said hood, the inner surface of said rear, top and side walls defining a first heat reflecting area for directing some portions of the radiant heat from said heat source to a region centrally of said band, the inner surface of said band element defining a second heat reflecting area for directing other portions of the radiant heat from said heat source and from said first heat reflecting area to a region centrally of said band.

5. An apparatus to prevent a fishing hole in an ice surface from freezing comprising a hood having a rear wall, a top wall and spaced side walls and having an open front, a band element having the width thereof oriented in an upright position, said band element projecting forwardly of said side walls secured to said side at the lower portions thereof and forming a closed loop, said band element adapted to partially surround the hole, a burner element defining a source of radiant heat disposed within said hood, the inner surface of said rear, top and side walls defining a first heat reflecting area for directing some portions of the radiant heat from said burner element to a region centrally of said band, the inner surface of said band element defining a second heat reflecting area for directing other portions of the radiant heat from said burner element to a region centrally of said band, said band element further functioning as a handle for carrying said apparatus, a receptacle type carriage disposed within said hood supporting said burner element in an upright relationship, said carriage comprising a horizontally disposed rectangular band member and at least one U-shaped member fixed to said rectangular band member, said carriage pivotally attached to said side walls and pivoting from an operating position to a transport position whereby said burner is maintained in upright relationship whether in the operating position or in transporting position.

References Cited in the file of this patent
UNITED STATES PATENTS

| 1,410,280 | Wolff | Mar. 21, 1922 |
| 1,425,096 | Humphrey | Aug. 8, 1922 |
| 1,567,691 | Wiederhold | Dec. 29, 1925 |
| 2,293,202 | Gardner | Aug. 18, 1942 |